United States Patent
Giessel et al.

(10) Patent No.: US 11,237,552 B2
(45) Date of Patent: Feb. 1, 2022

(54) FLIGHT TERMINATION SYSTEM FOR UNMANNED AIRCRAFT SYSTEMS

(71) Applicant: 9013733 CANADA INC., Cambridge (CA)

(72) Inventors: David S. Giessel, Cambridge (CA); Bruce Hildesheim, Kitchener (CA)

(73) Assignee: 9013733 CANADA INC.

( * ) Notice: Subject to any disclaimer, the term of this patent is extended or adjusted under 35 U.S.C. 154(b) by 251 days.

(21) Appl. No.: 16/170,672

(22) Filed: Oct. 25, 2018

(65) Prior Publication Data

US 2019/0129411 A1 May 2, 2019

Related U.S. Application Data

(60) Provisional application No. 62/577,290, filed on Oct. 26, 2017.

(51) Int. Cl.
*G05D 1/00* (2006.01)
*B64C 39/02* (2006.01)

(52) U.S. Cl.
CPC ......... *G05D 1/0016* (2013.01); *B64C 39/024* (2013.01); *G05D 1/0022* (2013.01); *G05D 1/0055* (2013.01); *B64C 2201/146* (2013.01)

(58) Field of Classification Search
CPC ............ B64C 2201/146; B64C 39/024; G05D 1/0016; G05D 1/0022; G05D 1/0055; G05D 1/0011

See application file for complete search history.

(56) References Cited

U.S. PATENT DOCUMENTS

| | | | |
|---|---|---|---|
| 8,755,950 B2 | 6/2014 | Johansson | |
| 2013/0238168 A1 | 9/2013 | Reyes | |
| 2014/0379173 A1* | 12/2014 | Knapp | G05D 1/0055 701/2 |
| 2017/0106986 A1* | 4/2017 | Sweeny | B64C 25/58 |
| 2017/0129603 A1* | 5/2017 | Raptopoulos | G05D 1/0676 |
| 2017/0297445 A1* | 10/2017 | Zheng | B60L 53/14 |

(Continued)

FOREIGN PATENT DOCUMENTS

WO 2009060176 A1 5/2009

*Primary Examiner* — Hunter B Lonsberry
*Assistant Examiner* — Matthew J. Reda
(74) *Attorney, Agent, or Firm* — Asgaard Patent Services, LLC; F. Wayne Thompson, Jr.

(57) ABSTRACT

Implementations of a flight termination system for unmanned aircraft systems are provided. The flight termination system comprises a ground-based flight termination transmitter (FTTx) located with an operator/observer, an airborne flight termination receiver (FTRx) located on an unmanned aircraft system (UAS), and a radio link connecting the FTTx and the FTRx. The FTTx is configured to communicate a TERMINATE FLIGHT message to the FTRx and, once the TERMINATE FLIGHT message has been confirmed, the FTRx is configured to terminate the flight of the UAS by disabling the propulsion system thereof. In this way, the UAS (e.g., a drone or other unmanned aerial vehicle) may be prevented from flying away in an uncontrolled fashion. The FTTx includes an arming switch that can be actuated by a provided key. The dedicated radio link connecting the FTTx and the FTRx is independent of any radio link used to operate the UAS.

10 Claims, 5 Drawing Sheets

(56) References Cited

U.S. PATENT DOCUMENTS

2017/0371332 A1* 12/2017 Hiisila ................ B64C 39/024
2018/0141751 A1* 5/2018 Muranaka ............ G05D 1/0066
2020/0103938 A1* 4/2020 Baek .................. H04M 1/7246

* cited by examiner

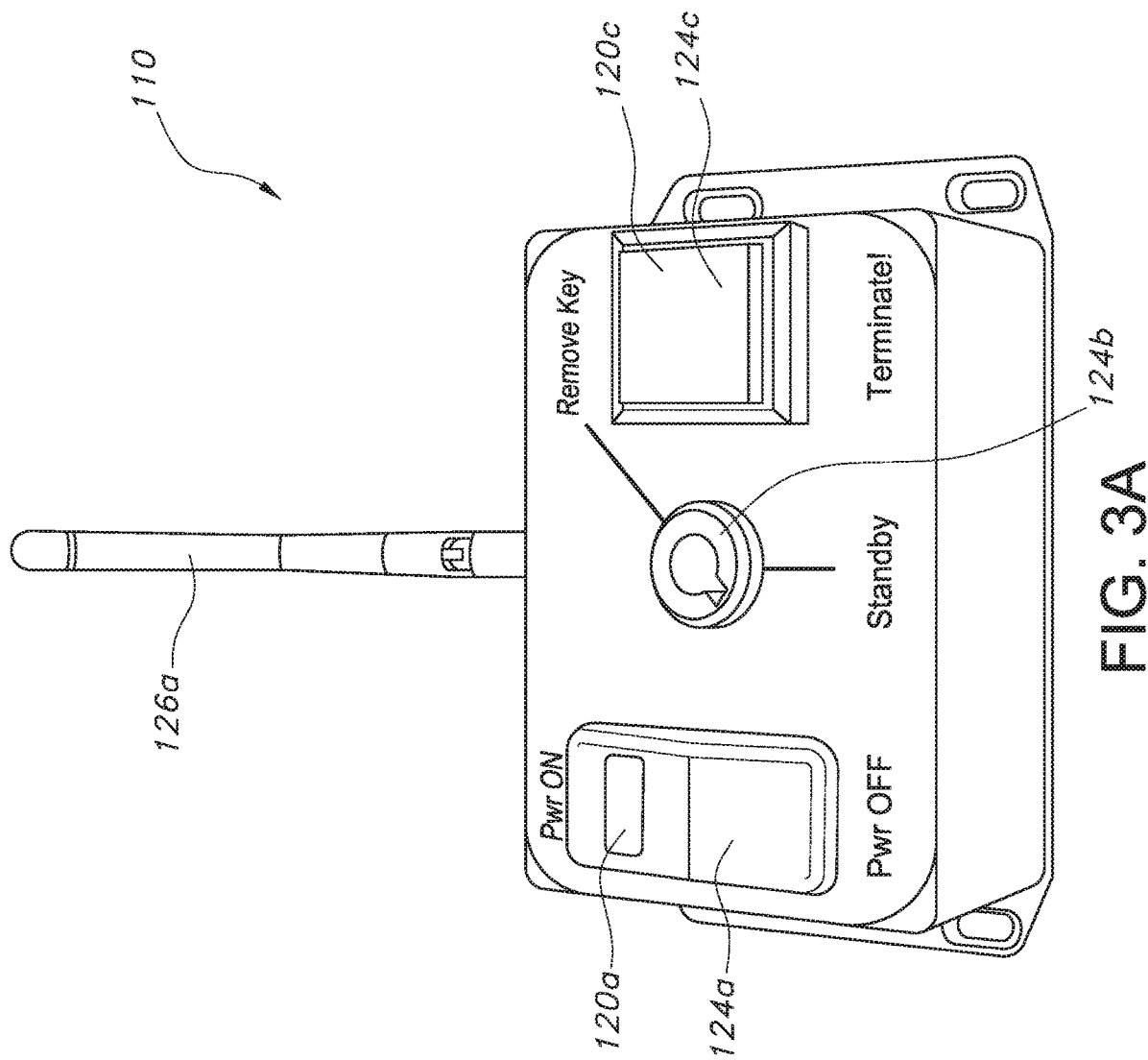

FLIGHT TERMINATION SYSTEM FOR UNMANNED AIRCRAFT SYSTEMS

CROSS REFERENCE TO RELATED APPLICATION

This application claims the benefit of U.S. Provisional Application Ser. No. 62/577,290, which was filed on Oct. 26, 2017, and is incorporated herein by reference in its entirety.

TECHNICAL FIELD

This disclosure relates to implementations of a flight termination system for unmanned aircraft systems. More particularly, the present invention relates to a flight termination system configured to disable the propulsion system of a remotely controlled unmanned aircraft system.

BACKGROUND

Remotely piloted vehicles and unmanned aerial systems/drones (UAS) are a rapidly expanding category of flying machines. By replacing the pilot with a remote-controlled system or autonomous flight computer, new categories of aircraft are made possible. For example, unmanned aerial systems that use an autonomous flight computer have been developed for mapping, surveying, and crop spraying purposes and remote-controlled unmanned aerial systems are frequently configured for photography and videography use.

However, because they lack an onboard pilot, unmanned aerial systems pose a safety risk due to the potential of a "fly away" event. During a fly away event, the operator no longer has control of the unmanned aerial vehicle (UAV) and can no longer keep it within the confines of a safe operating area (e.g. over an approved flying area or within an approved operational ceiling). A malfunction of the UAS flight controller typically precipitates a fly away event during which the flight controller is attempting to achieve a position in space (e.g. a desired GPS position), but one or more malfunctioning sensors (e.g., a compass or pressure altimeter) of the unmanned aerial vehicle are actually causing it to fly away from the desired location.

One approach to curtailing fly away events is the implementation of GPS based geo-fences that disable the unmanned aerial vehicle when it flies outside of a predefined airspace zone. This approach to curtailing fly away events is deficient because the unmanned aerial vehicle cannot be disabled until it arrives at the airspace boundary, at which point the UAV may be traveling so fast that is lands/crashes outside of the defined airspace zone, possibly at a location where the craft is unrecoverable by the operator (e.g., on the other side of a body of water).

Other unmanned aerial systems have incorporated "kill switch" functionality that can disable the unmanned aerial vehicle in the event of a fly away. The signal necessary to initiate the kill switch functionality is transmitted through the primary radio control link that an operator uses to fly the unmanned aerial vehicle. The approach is deficient for a couple of reasons. First, due to its reliance on the primary radio control link, the operator will not be able to activate the kill switch functionality of the unmanned aerial system if the primary radio link is lost or interrupted. Second, if the unmanned aerial vehicle's onboard flight controller starts rejecting radio transmitted commands (e.g., due to a software failure), the operator will be unable to activate the kill switch functionality of the unmanned aerial system.

Accordingly, it can be seen that needs exist for the flight termination system for unmanned aircraft systems disclosed herein. It is to the provision of a flight termination system for unmanned aircraft systems that is configured to address these needs, and others, that the present invention in primarily directed.

SUMMARY OF THE INVENTION

Implementations of a flight termination system for unmanned aircraft systems are provided. The example flight termination system is configured to terminate the flight of an unmanned aircraft system (UAS) by disabling the propulsion system thereof. In this way, the UAS (e.g., a drone or other unmanned aerial vehicle) may be prevented from flying away in an uncontrolled fashion.

In some implementations, the flight termination system comprises a ground-based flight termination transmitter (FTTx) located with an operator/observer, an airborne flight termination receiver (FTRx) located on a UAS, and a radio link connecting the FTTx and the FTRx. The FTTx is configured to communicate a TERMINATE FLIGHT message to the FTRx and, once the TERMINATE FLIGHT message has been confirmed, the FTRx is configured to terminate the flight of the UAS by disabling the propulsion system (or flight controller). The FTTx includes an arming switch that can be actuated by a provided key. The dedicated radio link connecting the FTTx and the FTRx is independent of any radio link used to operate (i.e., fly) the UAS.

In some implementations, the flight termination transmitter (FTTx) may comprise a system logic that is stored in a nonvolatile memory thereof. In some implementations, the system logic of the FTTx may include at least three method steps that are used to remotely terminate the flight of an UAS having an FTRx operationally connected thereto.

In a first step, in some implementations, once the FTTx has been powered ON, a first LED on the FTTx may illuminate and/or an audible speaker may emit a sound(s) (e.g., one or more short beeps).

Then, in some implementations, to proceed to the second step, an arming switch on the FTTx may be actuated by the USER. In some implementations, during actuation of the arming switch, the system logic may verify that the power source is adequate for operation and/or that the radio link connecting the FTTx and the FTRx is functioning.

In a second step, in some implementations, once the arming switch has been actuated, the FTTx enters a STANDBY mode. In some implementations, when in the STANDBY mode, a second LED on the FTTx may illuminate and/or the audible speaker may emit a sound(s) (e.g., one or more long/steady beeps).

Next, in some implementations, to proceed to the third step, the terminate switch may be actuated by the USER. Then, in some implementations, during actuation of the terminate switch, the system logic may send a message to the FTRx to TERMINATE FLIGHT of the operationally connected UAS. Next, in some implementations, in response to a TERMINATE FLIGHT CONFIRMATION REQUEST message received from the FTRx, the system logic may send a message to the FTRx confirming the request to TERMINATE FLIGHT. Then, in some implementations, the FTTx may receive a TERMINATE FLIGHT COMPLETION message from the FTRx.

In a third step, in some implementations, once the TERMINATE FLIGHT COMPLETION message has been received from the FTRx, the FTTx enters a TERMINATE mode. In some implementations, when in the TERMINATE mode, a third LED on the FTTx may illuminate and/or the audible speaker may emit a sound(s) (e.g., an audible alarm). In this way, the operator, via the FTTx, is notified that the flight of the UAS has been terminated.

In some implementations, the FTRx may be interfaced (or operationally connected) with the propulsion system of a UAS and configured to provide a single isolated output to the propulsion system of the UAS that can terminate the flight thereof on command.

In some implementations, the flight termination receiver may comprise a system logic that is stored in a nonvolatile memory thereof. In some implementations, the system logic of the FTRx may include at least three method steps that need be completed in order to terminate the flight of the UAS to which the FTRx is operationally connected. The second step and/or third step of the FTRx's system logic may only be initiated by an operator using an FTTx operationally connected to the FTRx via the radio link.

In a first step, in some implementations, once the FTRx has been powered ON, a first LED 140 on the FTRx may illuminate.

Then, in some implementations, to proceed to the second step, in response to the actuation of the arming switch of the FTTx, the system logic may verify that the power source is adequate for operation and/or that the radio link is functioning.

In a second step, in some implementations, once the arming switch of the FTTx has been actuated, the system logic of the FTRx enters a SYSTEM GOOD mode and may be configured to provide a SYSTEM GOOD output to the flight controller of the UAS.

Next, in some implementations, to proceed to the third step, the TERMINATE FLIGHT message must be received from the FTTx. Then, in some implementations, the FTRx may send a TERMINATE FLIGHT CONFIRMATION REQUEST message to the FTTx. Next, in some implementations, if the FTRx receives a message from the FTTx confirming the request to TERMINATE FLIGHT, the system logic proceeds to the third step.

In a third step, in some implementations, the system logic provides an output to the propulsion system of a UAS that can terminate the flight thereof. In this way, the UAS (e.g., a drone or other unmanned aerial vehicle) may be prevented from flying away in an uncontrolled fashion.

The bi-directional confirmation of the TERMINATE FLIGHT message reduces instances of erroneous operation and/or hacking of the flight termination system. Further, the TERMINATE FLIGHT message (and the echo sequence) is only transmitted in response to an operator actuating the terminate switch of the FTTx, a rare event. As a result, hackers using data aggregation techniques to identify messages being shared between the FTTx and the FTRx will be unable to "sniff" the radio link for the message(s) prior to the completions of the final method steps.

In some implementations, the radio link operationally connecting the FTTx and the FTRx uses a different frequency band than the flight controller of the UAS. In some implementations, the radio link connecting the FTTx and the FTRx may be physically and/or electrically independent from the flight controller of the UAS.

In some implementations, the flight termination system fails safe in that it does not terminate the flight of the UAS unless all of the conditions required by the system logics of the flight termination system are met.

BRIEF DESCRIPTION OF THE DRAWINGS

FIG. 3A illustrates a top view of an example flight termination transmitter.

Like reference numerals refer to corresponding parts throughout the several views of the drawings.

DETAILED DESCRIPTION

Figure 1:
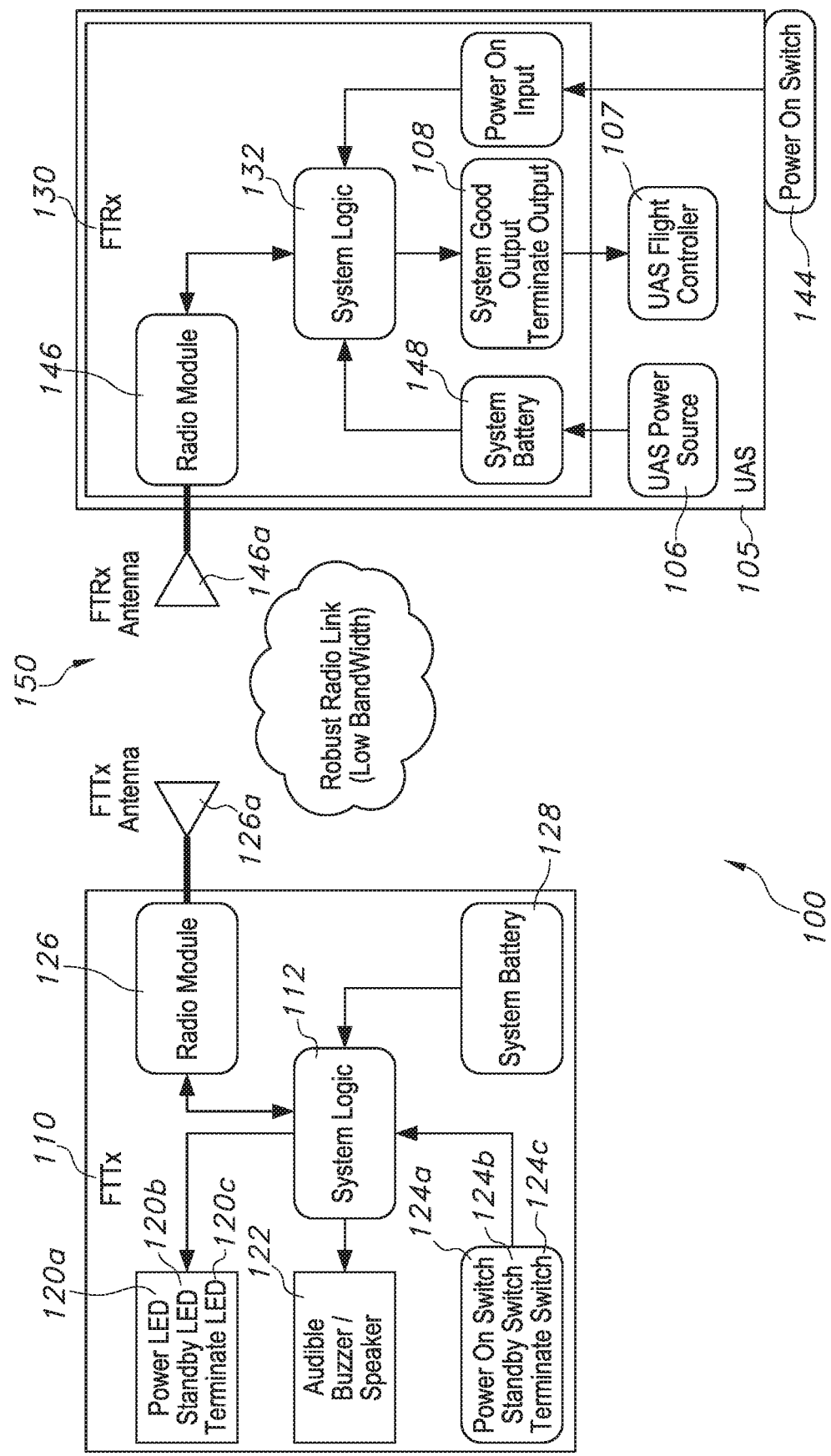
FIG. 1 illustrates a schematic diagram of an example flight termination transmitter and flight termination receiver according to the principles of the present disclosure.

FIG. 1 illustrates a flight termination system for unmanned aircraft systems 100 according to the principles of the present disclosure. In some implementations, the flight termination system 100 may be configured to terminate the flight of an unmanned aircraft system 105 (UAS) by disabling the propulsion system thereof. In this way, the UAS 105 (e.g., a drone or other unmanned aerial vehicle) may be prevented from flying away in an uncontrolled fashion.

As shown in FIG. 1, the flight termination system 100 may comprise a ground-based flight termination transmitter 110 (FTTx) located with an operator/observer, an airborne flight termination receiver 130 (FTRx) located on a UAS 105, and a radio link 150 connecting the FTTx 110 and the FTRx 130.

Figure 3B:
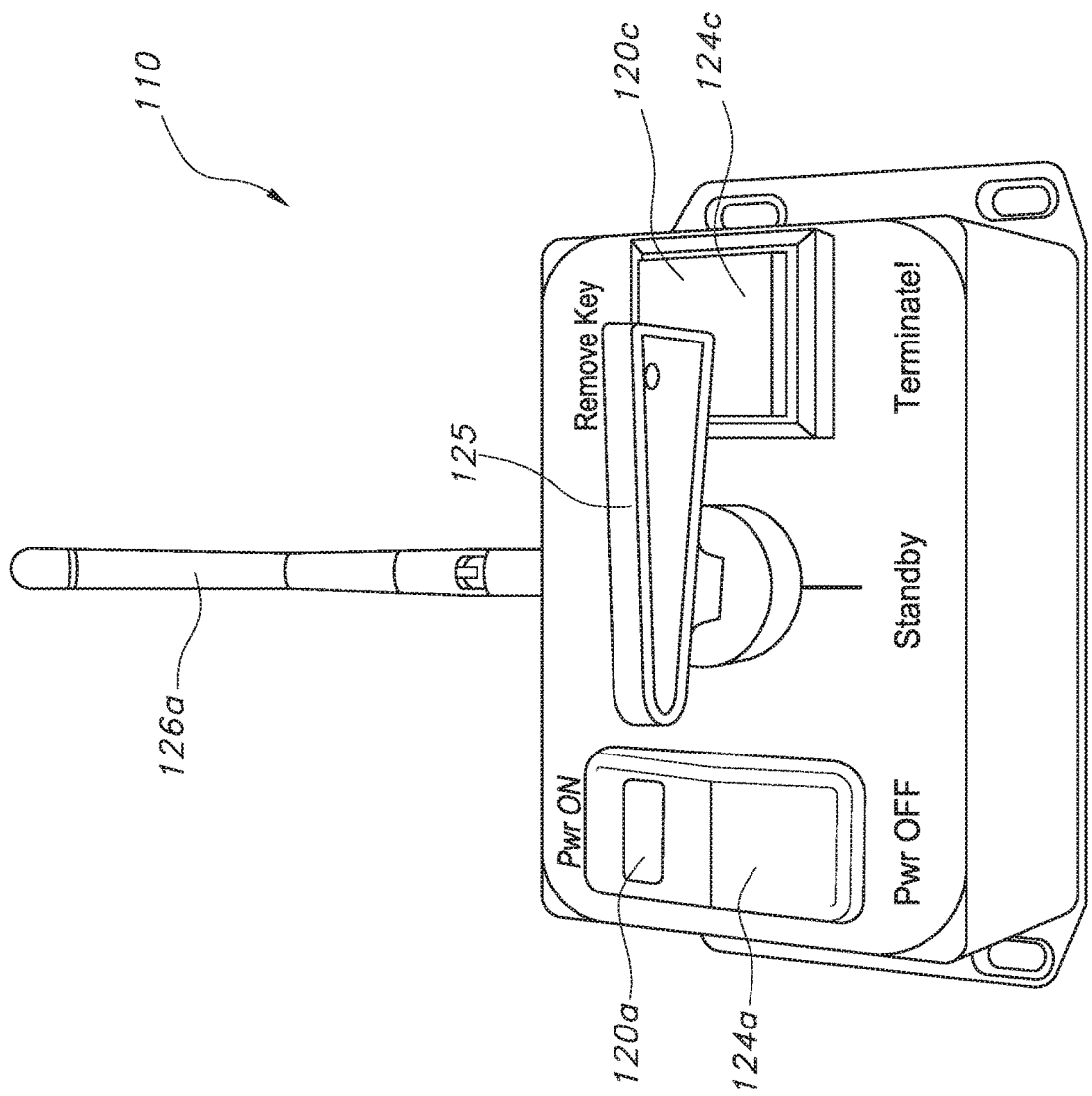
FIG. 3B illustrates the flight termination transmitter shown in FIG. 3A, wherein an arming switch key has been inserted into the arming switch of the flight termination transmitter.
Figure 3C:
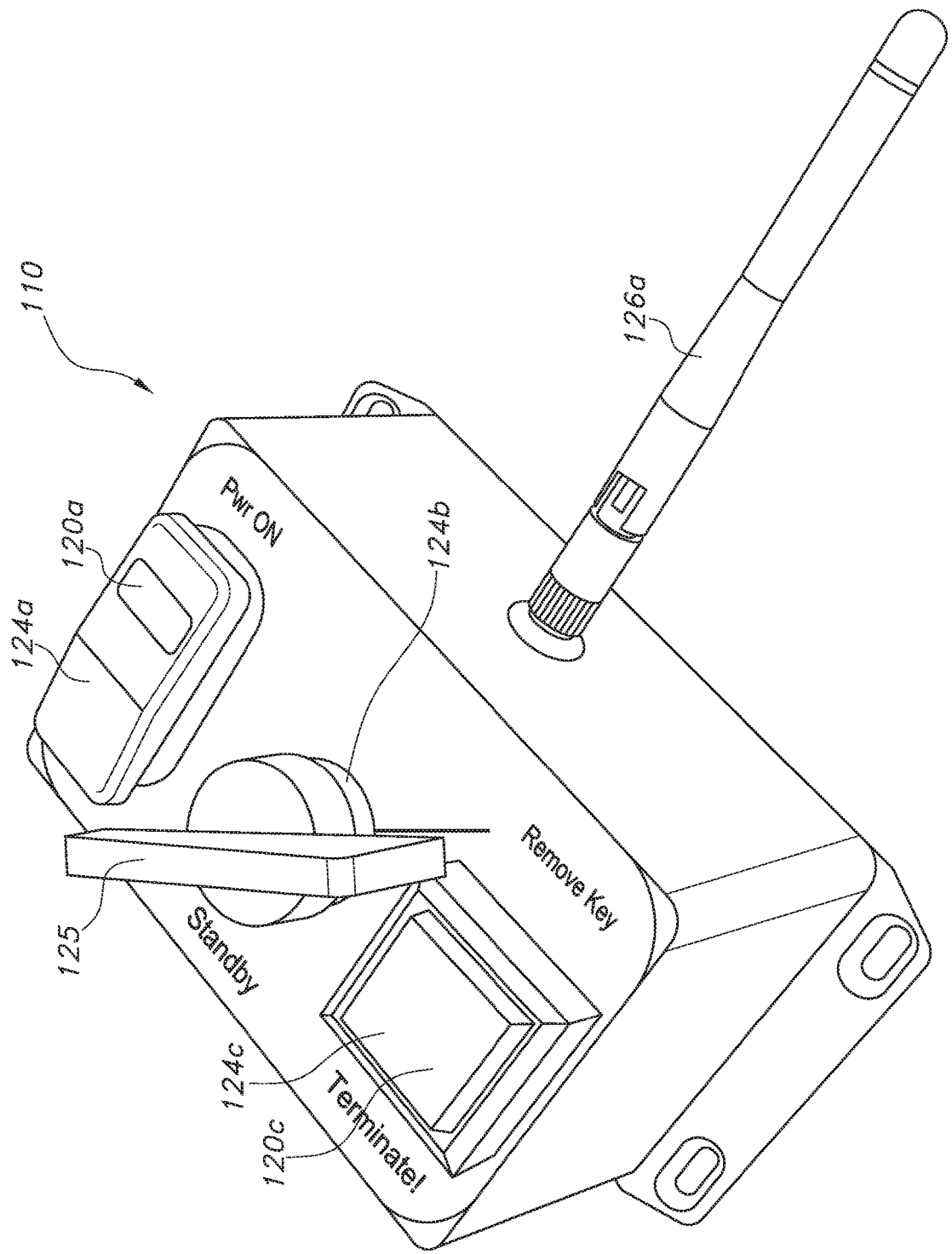
FIG. 3C illustrates a front isometric view of the flight termination transmitter shown in FIG. 3B.

As shown in FIGS. 3A-3C, in some implementations, the flight termination transmitter 110 may be configured as a controller meant to be held by an operator. In some implementations, the FTTx 110 may be located in, for example, an aircraft, ship, and/or other vehicle that is escorting the UAS 105. In some implementations, the FTTx 110 may be configured to provide unique visual and/or auditory indicators related to the functions thereof (discussed in greater detail below).

As shown in FIG. 1, in some implementations, the flight termination transmitter 110 may comprise a system logic 112 that is stored in a nonvolatile memory, three light emitting diodes 120 (LEDs), an audible speaker/buzzer 122, three switches 124, a radio module 126 having an antenna 126a, a power source 128, or any suitable combination thereof. In some implementations, the FTTx 110 may further comprise a microprocessor and/or other device specific hardware configured to enable the FTTx 110 to perform the functions that are implied and/or specified herein. In some implementations, in-lieu of a microprocessor, discreet logic gates may be used.

Figure 2:
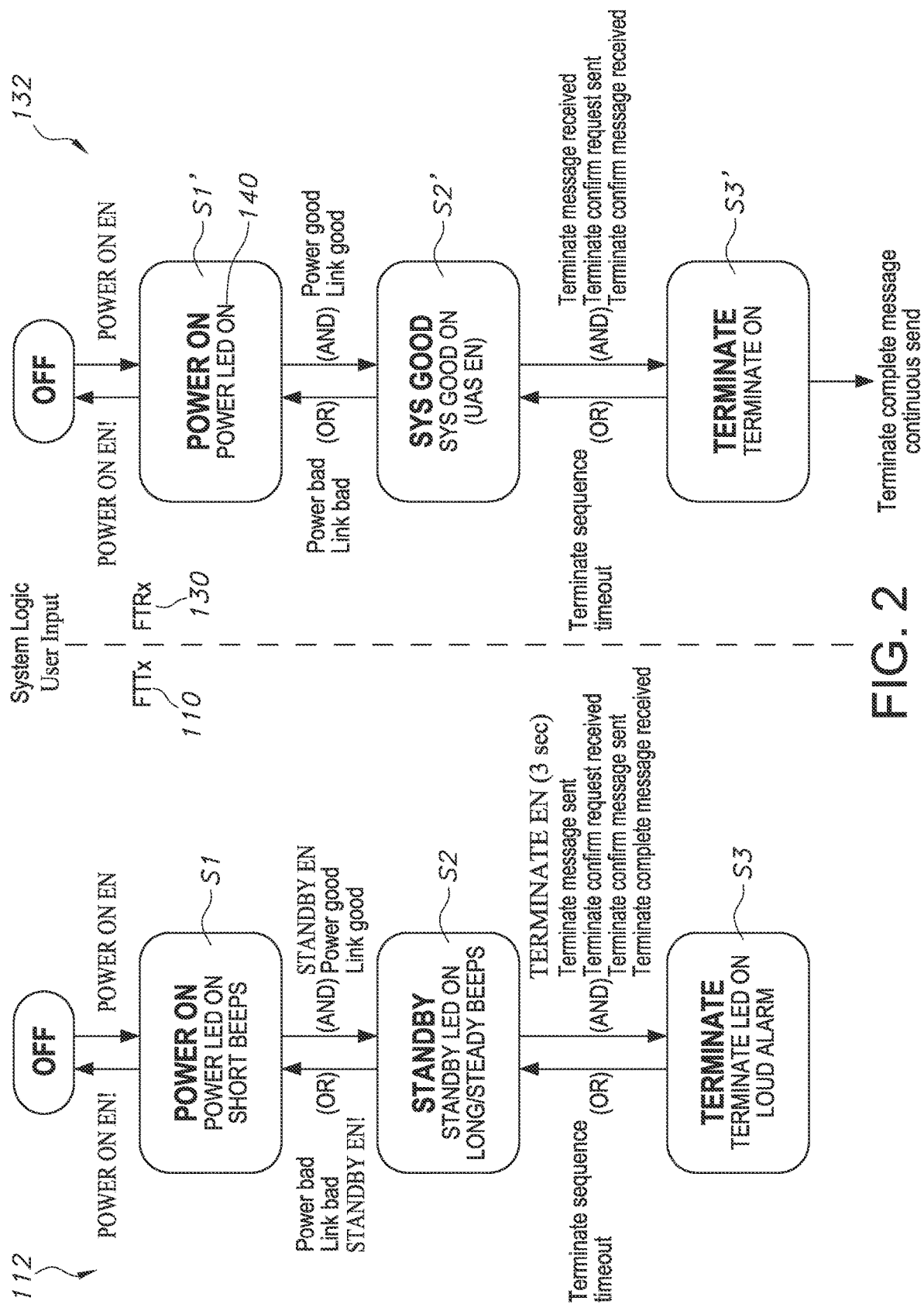
FIG. 2 illustrates an example system logic for both the flight termination transmitter and the flight termination receiver shown in FIG. 1.

FIG. 2 illustrates a flow chart showing the system logic 112 of the FTTx 110, the system logic 112 is discussed in greater detail below.

As shown in FIG. 1, in some implementations, the FTTx 110 may comprise a first LED 120a, a second LED 120b, and/or a third LED 120c (collectively LEDs 120). In some implementations, the first LED 120a may be configured to illuminate when the FTTx 110 has been powered ON (see, e.g., FIG. 2). In some implementations, the second LED 120b may be configured to illuminate when the FTTx 110 is in STANDBY mode (see, e.g., FIG. 2). In some implementations, the third LED 120c may be configured to illuminate when the TERMINATE FLIGHT sequence of the FTTx 110 has been initiated and/or completed (see, e.g., FIG. 2). In some implementations, the FTTx 110 may include more than three, or less than three, LEDs 120.

As shown in FIG. 1, in some implementations, the FTTx 110 may include an audible speaker and/or buzzer 122 configured to alert the user when one or more of the switches 124 have been activated. In some implementations, FTTx 110 may include more than one audible speaker and/or buzzer 122. In some implementations, the audible speaker and/or buzzer 122 of the FTTx 110 may be configured to emit one or more sounds suitable for alerting an operator to the completion and/or initiation of a method step (e.g., S1, S2, S3) of the system logic 112 (see, e.g., FIG. 2).

As shown in FIGS. 1 and 3A, in some implementations, the FTTx 110 may comprise a first switch 124a, a second switch 124b, and/or a third switch 124c. In some implementations, the first switch may be a power switch 124a configured to turn the FTTx 110 ON and/or OFF when actuated (e.g., pressed). In some implementations, the second switch may be an arming switch 124b configured to place the FTTx 110 in STANDBY mode when actuated (i.e., the second step S2 of the system logic 112). In some implementations, the second switch 124b may be actuated by inserting and turning a key 125 (see, e.g., FIGS. 3A-3C). In some implementations, the third switch may be a terminate switch 124c configured to terminate the flight of an UAS 105, equipped with an FTRx 130, when actuated (i.e., the third step S3 of the system logic 112). In some implementations, the FTTx 110 may include more than three, or less than three, switches 124. In some implementations, any style of switch known to one of ordinary skill in the art that is suitable for use as part of an FTTx 110 may be used therewith.

In some implementations, the frequency agile radio module 126 may comprise a radio, onboard microcontroller for system control, dual USB interfaces, and/or pin header connections. In some implementations, the USB interface(s) may be configured for use during diagnostics and/or data logging (e.g., quantifying packet loss, etc.). In some implementations, the pin header connections may be configured for power and/or interfacing with the other hardware components of the FTTx 110.

As shown in FIG. 1, in some implementations, the power source 128 for the FTTx 110 may be one or more batteries contained within the housing thereof. In some implementations, the power source 128 may be an electrical wall outlet. That is, in some implementations, electricity may be transferred from the wall outlet to the FTTx 110 via a power cord. In some implementations, the power source 128 may be configured to serve as an ultra-low noise power supply for the radio module 126 and/or other electrical components of the FTTx 110.

As shown in FIG. 2, in some implementations, the system logic 112 of the FTTx 110 may include at least three method steps (e.g., S1, S2, S3) that are used to remotely terminate the flight of an UAS 105 having an FTRx 130 operationally connected thereto.

In a first step S1, in some implementations, once the FTTx 110 has been powered ON, the first LED 120a may illuminate and/or the audible speaker 122 may emit a sound(s) (e.g., one or more short beeps).

Then, in some implementations, to proceed to the second step S2, the arming switch 124b is actuated by the USER. In some implementations, during actuation of the arming switch 124b, the system logic 112 verifies that the power source 128 is adequate for operation and/or that the radio link 150 between the FTTx 110 and the FTRx 130 is functioning.

In a second step S2, in some implementations, once the arming switch 124b has been actuated, the FTTx 100 enters a STANDBY mode. In some implementations, when in the STANDBY mode, the second LED 120b may illuminate and/or the audible speaker 122 may emit a sound(s) (e.g., one or more long/steady beeps).

Next, in some implementations, to proceed to the third step S3, the terminate switch 124c may be actuated by the USER. Then, in some implementations, during actuation of the terminate switch 124c, the system logic 112 may send a message to the FTRx 130 to TERMINATE FLIGHT of the operationally connected UAS 105. Next, in some implementations, in response to a TERMINATE FLIGHT CONFIRMATION REQUEST message received from the FTRx 130, the system logic 112 may send a message to the FTRx 130 confirming the request to TERMINATE FLIGHT. Then, in some implementations, the FTTx 110 may receive a TERMINATE FLIGHT COMPLETION message from the FTRx 130.

In a third step S3, in some implementations, once the TERMINATE FLIGHT COMPLETION message has been received from the FTRx 130, the FTTx 110 enters a TERMINATE mode. In some implementations, when in the TERMINATE mode, the third LED 120c may illuminate and/or the audible speaker 122 may emit a sound(s) (e.g., an audible alarm). In this way, the operator, via the FTTx 110, is notified that the flight of the UAS 105 has been terminated.

As shown in FIG. 1, in some implementations, the flight termination receiver 130 may be a module that is externally mounted on an existing UAS 105 and/or a module that is embedded in a UAS. In some implementations, the FTRx 130 may be interfaced with the propulsion system of a UAS 105. In some implementations, the FTRx 130 may be configured to provide a single isolated output 108 to the propulsion system of a UAS 105 that can terminate the flight thereof on command (see, e.g., FIGS. 1 and 2).

As shown in FIGS. 1 and 2, in some implementations, the flight of a UAS 105 may be terminated by preventing the flow of power between the power source 106 of the UAS 105 and the propulsion system thereof (e.g., the flight controller 107). In some implementations, the flight of a UAS 105 may be terminated by other methods, for example, setting the flight controller 107 to idle. In some implementations, the flight of a combustion powered UAS may be terminated by interrupting the combustion of the engine(s) used as part of its propulsion system.

As shown in FIG. 1, in some implementations, the flight termination receiver 130 may comprise a system logic 132 that is stored in a nonvolatile memory, a light emitting diode 140 (LED), a power switch 144, a radio module 146 having an antenna 146a, and/or a power source 148. In some implementations, the FTRx 130 may further comprise a microprocessor and/or other device specific hardware configured to enable the FTRx 130 to perform the functions that are implied and/or specified herein. In some implementations, in-lieu of a microprocessor, discreet logic gates may be used.

FIG. 2 illustrates a flow chart showing the system logic 132 of the FTRx 130, the system logic 132 is discussed in greater detail below.

As shown in FIG. 2, in some implementations, the FTRx 130 may comprise a first LED 140 that is configured to illuminate when the FTRx 130 has been powered ON. In some implementations, the FTRx 130 may include more than one LED 140 as needed and/or desired. In some implementations, the FTRx 130 may not include any LEDs thereon.

As shown in FIG. 1, in some implementations, the FTRx 130 may comprise a power switch 144 configured to turn the FTRx 130 ON and/or OFF when actuated (e.g., pressed). In some implementations, any style of switch known to one of ordinary skill in the art that is suitable for use as part of an FTRx 130 may be used therewith.

In some implementations, the frequency agile radio module 146 may be the same as, or similar to, the radio module 126 discussed above in connection with the FTTx 110.

As shown in FIG. 1, in some implementations, the power source 148 for the FTRx 130 may be one or more batteries contained within the housing thereof. In some implementations, the power source 148 may be configured to serve as an ultra-low noise power supply for the radio module 146 and/or other electrical components of the FTRx 130. In some implementations, the FTRx 130 may be powered by the power source 106 of the UAS 105.

As shown in FIG. 2, in some implementations, the system logic 132 of the FTRx 130 may include at least three method steps (e.g., S1', S2', S3') which must be completed in order to terminate the flight of the UAS 105. In some implementations, the second step S2' and/or third step S3' of the system logic 132 may only be initiated by an operator using an FTTx 110 operationally connected to the FTRx 130 via the radio link 150.

In a first step S1', in some implementations, once the FTRx 130 has been powered ON, the first LED 140 may illuminate.

Then, in some implementations, to proceed to the second step S2', in response to the actuation of the arming switch 124b of the FTTx 110, the system logic 132 verifies that the power source 148 is adequate for operation and/or that the radio link 150 is functioning.

In a second step S2', in some implementations, once the arming switch 124b of the FTTx 110 has been actuated, the system logic 132 of the FTRx 130 enters a SYSTEM GOOD mode and may be configured to provide a SYSTEM GOOD output to the flight controller 107 of the UAS 105 (see, e.g., FIGS. 1 and 2).

Next, in some implementations, to proceed to the third step S3', the TERMINATE FLIGHT message must be received from the FTTx 110. Then, in some implementations, the FTRx 130 may send a TERMINATE FLIGHT CONFIRMATION REQUEST message to the FTTx 110. Next, in some implementations, if the FTRx 130 receives a message from the FTTx 110 confirming the request to TERMINATE FLIGHT, the system logic 132 proceeds to the third step S3'.

In a third step S3', in some implementations, the system logic 132 may provide an output to the propulsion system of a UAS 105 that can terminate the flight thereof (see, e.g., FIG. 1). In this way, the UAS 105 (e.g., a drone or other unmanned aerial vehicle) may be prevented from flying away in an uncontrolled fashion.

In some implementations, through the use of bi-directional confirmation of the TERMINATE FLIGHT message, instances of erroneous operation and/or hacking of the flight termination system 100 are reduced.

As shown in FIG. 2, in some implementations, the TERMINATE FLIGHT message (and the echo sequence) is only transmitted in response to an operator actuating the terminate switch 124c of the FTTx 110, a rare event. As a result, hackers using data aggregation techniques to identify messages being shared between the FTTx 110 and the FTRx 130 will be unable to "sniff" the radio link for the message(s) prior to the completions of the method steps (i.e., step three S3 and step S3'). In some implementations, the radio link 150 may be encrypted to add an additional layer of protection.

As shown in FIG. 1, in some implementations, the radio link 150 may comprise the radio module 126 of the FTTx 110 and the radio module 146 of the FTRx 130. In some implementations, the radio link 150 of the flight termination system 100 may be a very low bandwidth system facilitating long radio range and/or a high degree of immunity from interference and/or jamming. In some implementations, the radio link 150 may comprise low to medium power radio that's in unlicensed and/or licensed frequency bands. In some implementations, the frequency agile radio modules 126, 146 of the radio link 150 may be configured to switch between a large number of frequency bands and/or to use unique channel hop sequences. In this way, the radio link 150 may be tailored to suit a wide range of UAS 105 operating distances and/or environments.

In some implementations, the radio link 150 may be configured to include multiple levels of RF (analog) and/or data (digital) integrity checks. For example, in some implementations, the integrity checks may include:

Verifying that the radio link 150 between the FTTx 110 and the FTRx 130 is functioning (see, e.g., FIG. 2);

Verifying that the signal strength of the radio link 150 is adequate for the proper function of the flight termination system 100;

Authenticating the radio link 150 between the FTTx 110 and the FTRx 130 (i.e., an encryption check);

Using a radio link 150 validation echo (i.e., a digital radio link 150 check); and/or Flight termination key codes that may be transmitted and/or authenticated by the FTTx 110 and FTRx 130 prior to FTRx 130 disabling the propulsion system of the UAS 105 (i.e., bi-directional codes).

In some implementations, the radio link 150 may use a different frequency band than the flight controller 107 of the UAS 105. In some implementations, the radio link 150 connecting the FTTx 110 and the FTRx 130 may be physically and/or electrically independent from the flight controller 107 of the UAS 105. In some implementations, the FTRx 130 may be a rugged and/or weather sealed module that is physically and/or electrically (i.e., signal) independent of the flight controller 107 of the UAS 105. In this way, electrical (i.e., signal) independence between the radio link 150, of the FTTx 110 and the FTRx 130, and the flight controller 107 of the UAS 105 is achieved. This approach to implementing the flight termination system 100 allows it to be statistically characterized for reliability and failure modes independent of other UAS 105 systems (e.g., the flight controller 107, etc.). In some implementations, when the FTRx 130 is physically and electrically (i.e., signal) independent of the flight controller 107, the flight termination system 100 may be configured to act as an overall system enable for the UAS 105. In this way, the flight controller 107 of the UAS 105 may be prevented from being powered ON and/or the UAS 105 flown without the flight termination system 100 being enabled and fully functional.

In some implementations, in order to prevent erroneous operation of the flight termination system 100, the FTRx 130 is configured to terminate the flight of the UAS 105 only when commanded by the FTTx 110 (see, e.g., FIG. 2).

In some implementations, if there is any interruption in the radio link 150, the flight termination system 100 will stay enabled throughout the glitch and/or loss of the radio link 150 (i.e., the propulsion system of the UAS 105 will not be disabled via the flight termination system 100).

In some implementations, in the event that the signal strength of the radio link 150 drops below a safe level, a system good output may be provided by the system logic 132 to the flight controller 107 of the UAS 105 (see, e.g., FIG. 1). As a result, in some implementations, the system logic 132 may direct the UAS 105 to return to a designated landing point, a designated loiter point, and/or to a position that is closer in proximity to the FTTx 110 of the flight termination system 100.

FIG. 2 shows a flow chart illustrating a method according to the present invention of terminating the flight of a UAS 105 equipped with the FTRx 130 of the flight termination system 100. In some implementations, the system logics 112, 132 of the flight termination system 100 may be characterized as a multiple input AND gate, where all conditions must be met in order to terminate the flight of the UAS 105. Succinctly put, in some implementations, the FTRx 130 of the flight termination system 100 must be powered ON, have transitioned to the SYSTEM GOOD mode, have an adequate radio link 150, receive the TERMINATE FLIGHT message from the FTTx 110, and a TERMINATE FLIGHT confirmation message in response to the TERMINATE FLIGHT CONFIRMATION REQUEST sent by the FTRx 130 in order to terminate the flight of the UAS 105.

In some implementations, the flight termination system 100 fails safe in that it does not terminate the flight of the UAS 105 unless all of the conditions required by the system logics 112, 132 of the flight termination system 100 are met. Requiring that all conditions of the system logics 112, 132 be met at the time of activation provides a statistically high degree of glitch prevention. Further, in some implementations, the conditions imposed by the system logic 112, 132 of the flight termination system 100 are all independent of the mechanical and/or electrical systems of the UAS 105. As a result of this, the flight termination system 100 does not statistically reduce the operational reliability of the UAS 105 that the FTRx 130 is installed on.

Although not shown in the drawings, it will be understood that suitable wiring connects the electrical components of the FTTx 110 and the FTRx 130 of the flight termination system 100 disclosed herein.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A flight termination system for an unmanned aircraft system, the flight termination system comprising:
    a flight termination transmitter configured to initiate a TERMINATE FLIGHT sequence and to confirm the initiation of the TERMINATE FLIGHT sequence, the flight termination transmitter comprises an arming switch and a key for the arming switch;
    a flight termination receiver that can be operationally connected to a flight controller of the unmanned aircraft system, the flight termination receiver is configured to disable the operationally connected flight controller upon receiving confirmation from the flight termination transmitter to complete the TERMINATE FLIGHT sequence initiated thereby; and
    a radio link configured to operationally connect the flight termination transmitter and the flight termination receiver, the radio link includes a first radio module that is part of the flight termination transmitter and a second radio module that is part of the flight termination receiver, the first radio module and the second radio module are electrically independent from any radio link used to operate the unmanned aircraft system having the flight controller to which the flight termination receiver is operationally connected;
    wherein the arming switch of the flight termination transmitter includes an opening configured to receive a portion of the key therein and is configured to be actuated by the key being inserted into the opening and turned;
    wherein the flight termination receiver is a sealed module that is physically independent from the flight controller of the unmanned aircraft system;
    wherein the flight termination receiver is configured to provide an output that can disable the operationally connected flight controller and thereby terminate the flight of the unmanned aircraft system.

2. A flight termination system for an unmanned aircraft system, the flight termination system comprising:
    a flight termination transmitter configured to remotely terminate the flight of the unmanned aircraft system, the flight termination transmitter comprises an arming switch, a key for the arming switch, a radio module, and a system logic that is stored in a nonvolatile memory; and
    a flight termination receiver that can be operationally connected to a flight controller of the unmanned aircraft system, the flight termination receiver is configured to provide an output that can disable the operationally connected flight controller and thereby terminate the flight of the unmanned aircraft system, the flight termination receiver is a sealed module that is physically independent from the flight controller, the flight termination receiver comprises a radio module and a system logic that is stored in a nonvolatile memory;
    wherein the arming switch of the flight termination transmitter includes an opening configured to receive a portion of the key therein and is configured to be actuated by the key being inserted into the opening and turned;
    wherein the radio module of the flight termination transmitter and the radio module of the flight termination receiver are configured to establish a radio link that is electrically independent of any radio link used to operate the unmanned aircraft system having the flight controller to which the flight termination receiver is operationally connected, the radio link operationally connects the flight termination transmitter and the flight termination receiver;

wherein the system logic of the flight termination transmitter is configured to:

send a TERMINATE FLIGHT message to the flight termination receiver; and send a TERMINATE FLIGHT confirmation message to the flight termination receiver in response to a TERMINATE FLIGHT CONFIRMATION REQUEST message received therefrom;

wherein the system logic of the flight termination receiver is configured to:

send the TERMINATE FLIGHT CONFIRMATION REQUEST message in response to receiving the TERMINATE FLIGHT message from the flight termination transmitter; and provide the output that can disable the operationally connected flight controller in response to receiving the TERMINATE FLIGHT confirmation message from the flight termination transmitter.

3. The flight termination system of claim 2, wherein the system logic of the flight termination receiver is configured to send a TERMINATE FLIGHT COMPLETION message to the flight termination transmitter.

4. A flight termination system for an unmanned aircraft system, the flight termination system comprises:

a flight termination transmitter configured to remotely terminate the flight of the unmanned aircraft system, the flight termination transmitter comprises an arming switch, a key for the arming switch, a terminate switch, a radio module, and a system logic that is stored in a nonvolatile memory; and a flight termination receiver that can be operationally connected to a flight controller of the unmanned aircraft system, the flight termination transmitter is configured to provide an output that can disable the operationally connected flight controller and thereby terminate the flight of the unmanned aircraft system, the flight termination receiver is a sealed module that is physically independent from the flight controller, the flight termination receiver comprises a radio module and a system logic that is stored in a nonvolatile memory;

wherein the arming switch of the flight termination transmitter includes an opening configured to receive a portion of the key therein and is configured to be actuated by the key being inserted into the opening and turned;

wherein the radio module of the flight termination transmitter and the radio module of the flight termination receiver are configured to establish a radio link that is electrically independent of any radio link used to operate the unmanned aircraft system having the flight controller to which the flight termination receiver is operationally connected, the radio link operationally connects the flight termination transmitter and the flight termination receiver;

wherein the system logic of the flight termination transmitter is configured to:

enter a STANDBY mode in response to the arming switch being actuated;

send a TERMINATE FLIGHT message to the flight termination receiver in response to the terminate switch being actuated; and send a TERMINATE FLIGHT confirmation message to the flight termination receiver in response to a TERMINATE FLIGHT CONFIRMATION REQUEST message received therefrom;

wherein the system logic of the flight termination receiver is configured to:

enter a SYSTEM GOOD mode in response to the arming switch of the flight termination transmitter being actuated;

send the TERMINATE FLIGHT CONFIRMATION REQUEST message in response to receiving the TERMINATE FLIGHT message from the flight termination transmitter; and provide the output to the operationally connected flight controller that can disable it in response to receiving the TERMINATE FLIGHT confirmation message from the flight termination transmitter.

5. The flight termination system of claim 4, wherein the system logic of the flight termination receiver is also configured to: send a TERMINATE FLIGHT COMPLETION message to the flight termination transmitter; and the system logic of the flight termination transmitter is also configured to enter a TERMINATE mode in response to receiving the TERMINATE FLIGHT COMPLETION message from the flight termination receiver, when in the TERMINATE mode the flight termination transmitter notifies an operator that the flight of the unmanned aircraft system, having the flight controller to which the flight termination receiver is operationally connected, has been terminated.

6. The flight termination system of claim 4, wherein the system logic of the flight termination transmitter is also configured to: verify that the radio link, operationally connecting the flight termination transmitter and the flight termination receiver, is functioning in response to the arming switch being actuated.

7. The flight termination system of claim 6, wherein verification of the radio link by the system logic of the flight termination transmitter occurs prior to the system logic entering the STANDBY mode.

8. The flight termination system of claim 6, wherein the system logic of the flight termination receiver is also configured to: verify that the radio link, operationally connecting the flight termination transmitter and the flight termination receiver, is functioning in response to the arming switch being actuated.

9. The flight termination system of claim 8, wherein verification of the radio link by the system logic of the flight termination receiver occurs prior to the system logic entering the SYSTEM GOOD mode.

10. The flight termination system of claim 4, wherein the terminate switch of the flight termination transmitter can only be actuated after the arming switch has been actuated and the system logic enters the STANDBY mode.

* * * * *